(12) United States Patent
Hershko et al.

(10) Patent No.: US 10,248,613 B2
(45) Date of Patent: Apr. 2, 2019

(54) DATA BUS ACTIVATION IN AN ELECTRONIC DEVICE

(71) Applicant: QUALCOMM Incorporated, San Diego, CA (US)

(72) Inventors: Yuval Corey Hershko, Haifa (IL); Lior Amarilio, Yokneam (IL); Nir Strauss, Yokneam (IL)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 15/402,519

(22) Filed: Jan. 10, 2017

(65) Prior Publication Data

US 2018/0196776 A1   Jul. 12, 2018

(51) Int. Cl.
  *G06F 13/20*  (2006.01)
  *G06F 13/42*  (2006.01)

(52) U.S. Cl.
  CPC .................. *G06F 13/4291* (2013.01)

(58) Field of Classification Search
  CPC .................. G06F 13/4291; G06F 13/4265
  See application file for complete search history.

(56) References Cited

U.S. PATENT DOCUMENTS

| | | | |
|---|---|---|---|
| 5,944,826 A * | 8/1999 | Kocks ................ | G06F 13/4213 713/320 |
| 8,548,534 B2 | 10/2013 | Crestol | |
| 8,862,792 B2 * | 10/2014 | Hess ................... | G06F 13/00 710/19 |
| 2004/0210728 A1 * | 10/2004 | Flautner ............. | G06F 12/0893 711/156 |
| 2005/0264254 A1 * | 12/2005 | Lequesne ........... | H02H 7/0833 318/701 |
| 2007/0030155 A1 * | 2/2007 | Van Woudenberg .. | A61B 7/003 340/573.1 |
| 2012/0078397 A1 * | 3/2012 | Lee .................... | G10L 25/78 700/94 |
| 2013/0053047 A1 * | 2/2013 | Rai .................... | H04W 16/18 455/448 |
| 2014/0188470 A1 | 7/2014 | Chang et al. | |
| 2014/0270246 A1 * | 9/2014 | Swanson ............. | H04R 3/005 381/92 |

(Continued)

*Primary Examiner* — Jing-Yih Shyu
(74) *Attorney, Agent, or Firm* — Withrow & Terranova, PLLC

(57) ABSTRACT

Data bus activation in an electronic device is provided. In one aspect, a host circuit determines a cumulative potential representing a cumulative fractional bus activation vote on a data line(s) in the data bus. The host circuit activates the data bus when the cumulative potential is greater than a configurable bus activation threshold. In another aspect, a device circuit(s) determines a selected signal strength threshold that is less than determined signal strength of an incoming signal. Accordingly, the device circuit(s) asserts a fractional potential corresponding to the selected signal strength threshold on the data line(s) as a fractional bus activation vote in the cumulative fractional bus activation vote. By activating the data bus based on the cumulative fractional bus activation vote, the host circuit can support timely data bus activation while preventing the data bus from being falsely activated, thus improving robustness of data bus activation in the electronic device.

28 Claims, 12 Drawing Sheets

(56) References Cited

U.S. PATENT DOCUMENTS

| | | | |
|---|---|---|---|
| 2015/0199963 A1* | 7/2015 | Maaninen | G10L 15/16 |
| | | | 704/232 |
| 2015/0234443 A1* | 8/2015 | Kulathumani | H04W 4/70 |
| | | | 340/3.1 |
| 2016/0105162 A1 | 4/2016 | Zangi et al. | |
| 2016/0132097 A1* | 5/2016 | Gainey | G06F 1/324 |
| | | | 713/323 |
| 2016/0342890 A1* | 11/2016 | Young | G06N 5/04 |
| 2016/0344902 A1* | 11/2016 | Kim | H04N 5/607 |
| 2016/0357504 A1* | 12/2016 | Khazin | G06F 1/08 |
| 2017/0105791 A1* | 4/2017 | Yates | A61B 18/1445 |

\* cited by examiner

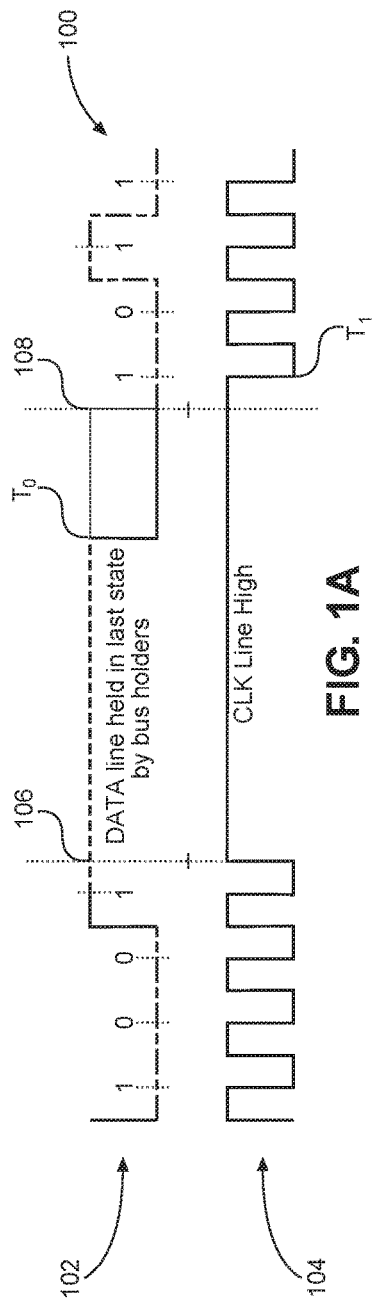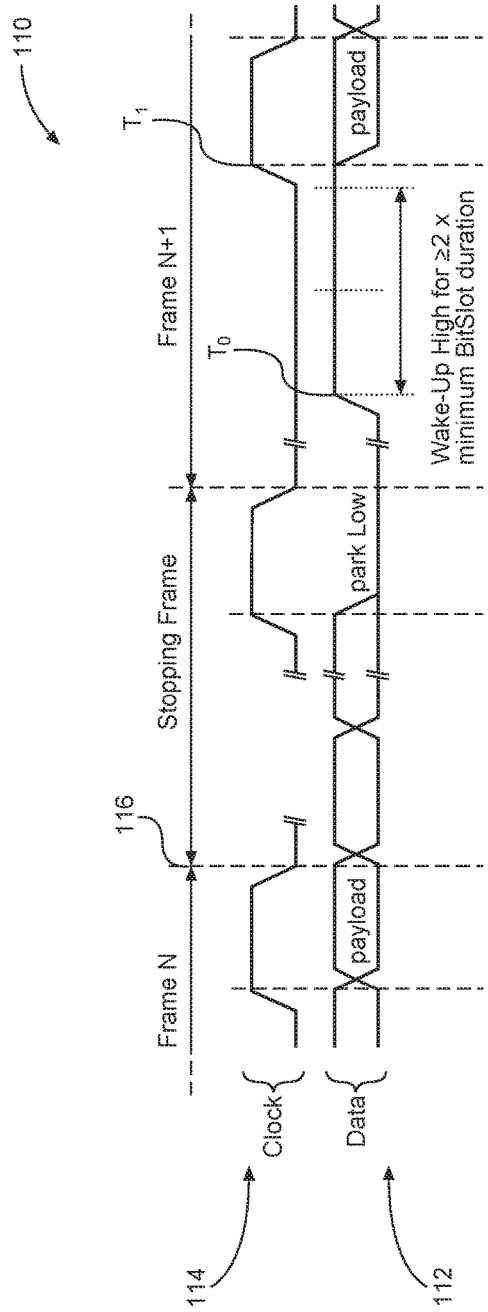

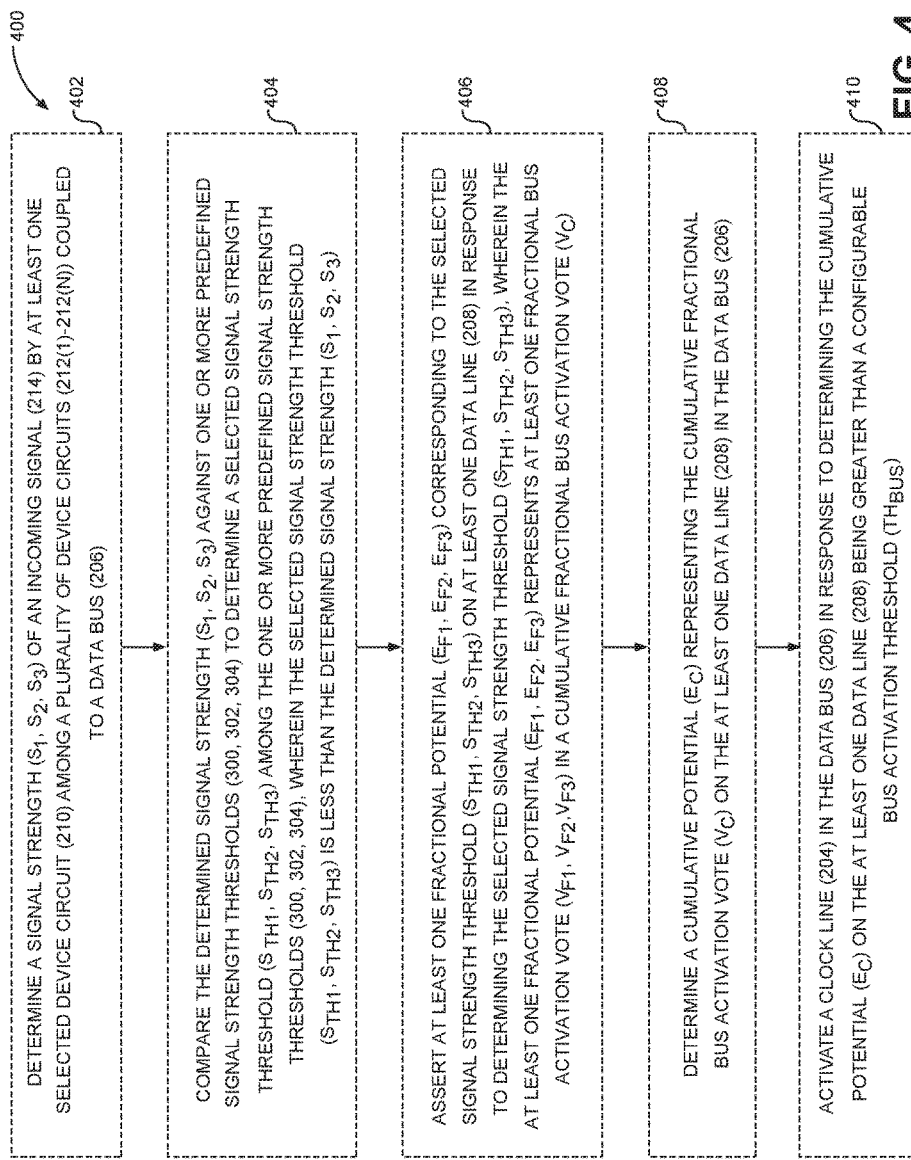

DATA BUS ACTIVATION IN AN ELECTRONIC DEVICE

BACKGROUND

I. Field of the Disclosure

The technology of the disclosure relates generally to data bus activation in an electronic device.

II. Background

Mobile communication devices have become increasingly common in current society. The prevalence of these mobile communication devices is driven in part by the many functions that are now enabled on such devices. Increased processing capabilities in such devices means that mobile communication devices have evolved from pure communication tools into sophisticated mobile entertainment centers that enable enhanced user experiences.

Increasingly complex integrated circuits (ICs) have been designed and manufactured to provide greater functionality in a mobile communication device. One such complex IC is a host circuit for concurrently controlling distributed peripheral devices (e.g., microphones, sensors, etc.) over a shared data bus. To help conserve power and prolong battery life, the distributed peripheral devices opportunistically enter a power-conserving mode (e.g., standby or idle), and the host circuit suspends the shared data bus accordingly.

While operating in the power-conserving mode, the distributed peripheral devices may each request the host circuit to activate the shared data bus in response to specific triggering events. As such, it may be desired to provide an effective data bus activation mechanism in the mobile communication device to support timely bus activation, while preventing the distributed peripheral devices from falsely triggering the bus activation.

SUMMARY OF THE DISCLOSURE

Aspects disclosed in the detailed description include data bus activation in an electronic device. In one aspect, a host circuit in an electronic device determines a cumulative potential representing a cumulative fractional bus activation vote on a data line(s) in the data bus. The host circuit wakes up (e.g., activates the data bus) when the cumulative potential is greater than a configurable bus activation threshold. In another aspect, a device circuit(s) determines a selected signal strength threshold that is less than a determined signal strength of an incoming signal. Accordingly, the device circuit(s) asserts a fractional potential (e.g., voltage) corresponding to the selected signal strength threshold on the data line(s) as a fractional bus activation vote in the cumulative fractional bus activation vote. By activating the data bus based on the cumulative fractional bus activation vote, the host circuit can support timely data bus activation while preventing the data bus from being falsely activated, thus improving robustness of data bus activation in the electronic device.

In this regard, in one aspect, an electronic device is provided. The electronic device includes a host circuit configured to be coupled to a data bus including a clock line and at least one data line. The host circuit is further configured to determine a cumulative potential representing a cumulative fractional bus activation vote on the at least one data line. The host circuit is also configured to activate the clock line in response to determining the cumulative potential on the at least one data line being greater than a configurable bus activation threshold.

In another aspect, an electronic device is provided. The electronic device includes a plurality of device circuits configured to be coupled to a data bus including a clock line and at least one data line. At least one selected device circuit among the plurality of device circuits is configured to determine a signal strength of an incoming signal. The at least one selected device circuit is also configured to compare the determined signal strength against one or more predefined signal strength thresholds to determine a selected signal strength threshold among the one or more predefined signal strength thresholds. The selected signal strength threshold is less than the determined signal strength. The at least one selected device circuit is also configured to assert at least one fractional potential corresponding to the selected signal strength threshold on the at least one data line in response to determining the selected signal strength threshold. The at least one fractional potential represents a fractional bus activation vote from the at least one selected device circuit.

In another aspect, an electronic device is provided. The electronic device includes a data bus including a clock line and at least one data line. The electronic device also includes a host circuit coupled to the data bus. The host circuit is configured to determine a cumulative potential representing a cumulative fractional bus activation vote on the at least one data line. The host circuit is also configured to activate the clock line in response to determining the cumulative potential on the at least one data line being greater than a configurable bus activation threshold. The electronic device also includes a plurality of device circuits coupled to the data bus. At least one selected device circuit among the plurality of device circuits is configured to determine a signal strength of an incoming signal. The at least one selected device circuit is also configured to compare the determined signal strength against one or more predefined signal strength thresholds to determine a selected signal strength threshold among the one or more predefined signal strength thresholds. The selected signal strength threshold is less than the determined signal strength. The at least one selected device circuit is also configured to assert at least one fractional potential corresponding to the selected signal strength threshold on the at least one data line in response to determining the selected signal strength threshold. The at least one fractional potential represents at least one fractional bus activation vote in the cumulative fractional bus activation vote.

In another aspect, an electronic device is provided. The electronic device includes a data bus including a clock line and at least one data line. The electronic device also includes a means for activating the data bus. The means for activating the data bus is coupled to the data bus and is configured to determine a cumulative potential representing a cumulative fractional bus activation vote on the at least one data line. The means for activating the data bus is also configured to activate the clock line in response to determining the cumulative potential on the at least one data line being greater than a configurable bus activation threshold. The electronic device also includes a plurality of means for voting. The plurality of means for voting is coupled to the data bus. At least one selected means for voting among the plurality of means for voting is configured to determine a signal strength of an incoming signal. The at least one selected means for voting is also configured to compare the determined signal strength against one or more predefined signal strength thresholds to determine a selected signal strength threshold among the one or more predefined signal strength thresholds. The selected signal strength threshold is less than the determined signal strength. The at least one selected means for voting is also configured to assert at least one fractional potential corresponding to the selected signal strength threshold on the at least one data line in response to determining the selected signal strength threshold. The at least one fractional potential represents at least one fractional bus activation vote in the cumulative fractional bus activation vote.

In another aspect, a method for activating a data bus in an electronic device is provided. The method includes determining a signal strength of an incoming signal by at least one selected device circuit among a plurality of device circuits coupled to the data bus. The method also includes comparing the determined signal strength against one or more predefined signal strength thresholds to determine a selected signal strength threshold among the one or more predefined signal strength thresholds. The selected signal strength threshold is less than the determined signal strength. The method also includes asserting at least one fractional potential corresponding to the selected signal strength threshold on at least one data line in response to determining the selected signal strength threshold. The at least one fractional potential represents at least one fractional bus activation vote in a cumulative fractional bus activation vote. The method also includes determining a cumulative potential representing the cumulative fractional bus activation vote on the at least one data line in the data bus. The method also includes activating a clock line in the data bus in response to determining the cumulative potential on the at least one data line being greater than a configurable bus activation threshold.

BRIEF DESCRIPTION OF THE FIGURES

FIG. 1A is a schematic diagram of an exemplary data bus wakeup timing sequence for activating a MIPI Alliance Serial Low-power Inter-chip Media Bus (SLIMbus);

FIG. 1B is a schematic diagram of an exemplary data bus wakeup timing sequence for activating a MIPI Alliance SoundWire bus;

FIG. 4 is a flowchart of an exemplary process that the electronic device of FIG. 2 can perform to activate the data bus;

DETAILED DESCRIPTION

Figure 2:
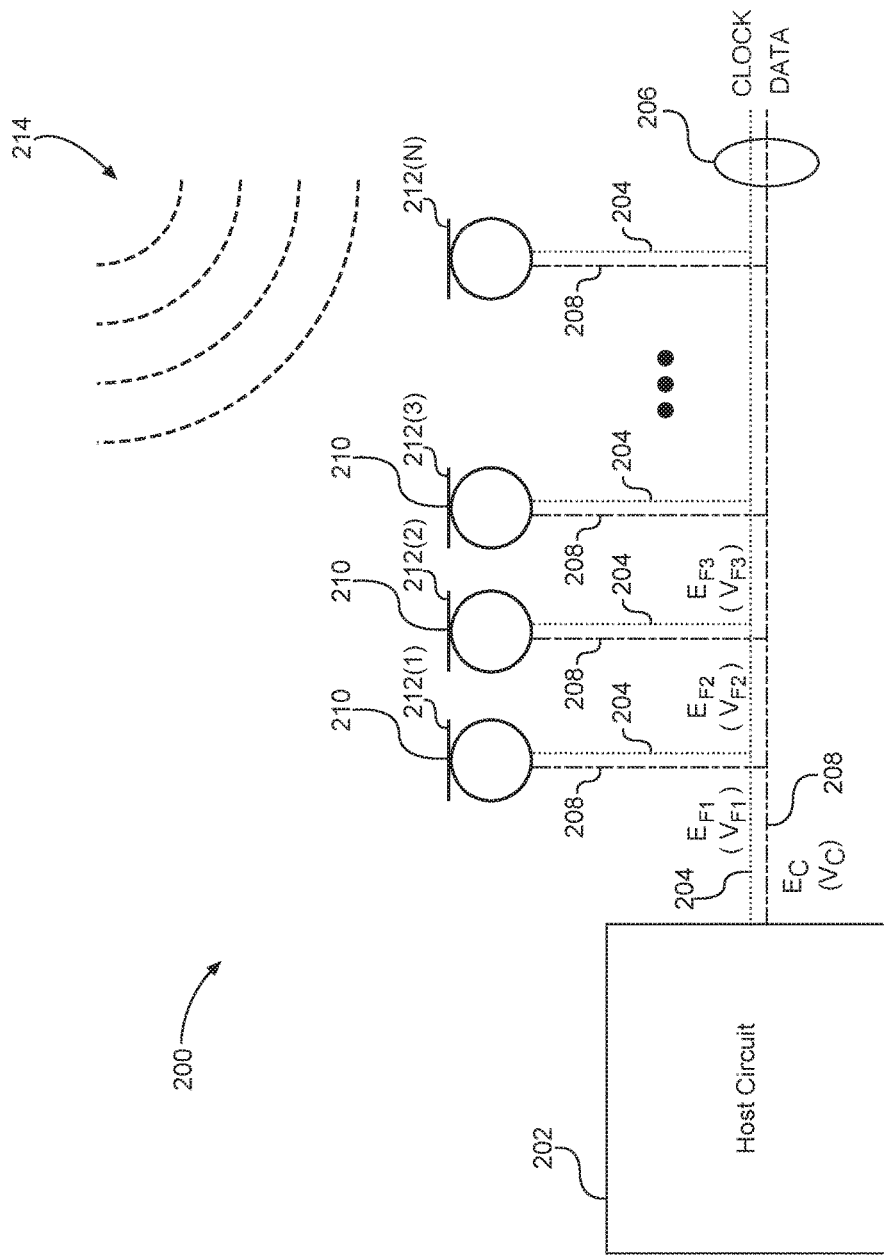
FIG. 2 is a schematic diagram of an exemplary electronic device in which a host circuit is configured to activate a clock line in a data bus based on a cumulative fractional bus activation vote asserted on at least one data line in the data bus.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include data bus activation in an electronic device. In one aspect, a host circuit in an electronic device determines a cumulative potential representing a cumulative fractional bus activation vote on a data line(s) in the data bus. The host circuit wakes up (e.g., activates the data bus) when the cumulative potential is greater than a configurable bus activation threshold. In another aspect, a device circuit(s) determines a selected signal strength threshold that is less than a determined signal strength of an incoming signal. Accordingly, the device circuit(s) asserts a fractional potential (e.g., voltage) corresponding to the selected signal strength threshold on the data line(s) as a fractional bus activation vote in the cumulative fractional bus activation vote. By activating the data bus based on the cumulative fractional bus activation vote, the host circuit can support timely data bus activation while preventing the data bus from being falsely activated, thus improving robustness of data bus activation in the electronic device.

In an exemplary aspect, the electronic device mentioned above can be a voice-operated electronic device including a host circuit coupled to multiple microphones by a data bus, such as a Mobile Industry Processor Interface (MIPI) Alliance Serial Low-power Inter-chip Media Bus (SLIMbus) or a MIPI Alliance SoundWire (SoundWire) bus. The voice-operated electronic device is configured to perform a specific computing task(s) and/or launch a specific application(s) in response to a voice command (e.g., a hot word/phrase such as "Play soundtrack 15" and "How is the weather today?") detected by the microphones. In this regard, in a non-limiting example, the voice-operated electronic device can be a smart phone capable of supporting such voice-operated applications as Apple Ski, Amazon Echo/Alexa, or Google Assistant.

The microphones may be disposed at different locations in the electronic device to help detect the voice command from different propagation paths and/or distances. In this regard, the microphones may detect the voice command at different signal strengths. In a non-limiting example, a microphone can detect a respective signal strength based on detecting energy level and/or a signal-to-noise ratio (SNR) of the voice command. In another non-limiting example, the microphone can also detect the respective signal strength of the voice command based on a matching accuracy determined by comparing the detected voice command against a known voice sample (e.g., voice samples pre-stored in a sample library).

Conventionally, the microphones are configured to request the host circuit to activate the data bus independently in response to detecting the voice command. In this regard, each of the microphones can submit an individual bus activation vote (e.g., assert a specific voltage on a data line in the data bus) to the host circuit to activate the data bus. As a result, the host circuit can activate the data bus based on the individual bus activation vote submitted by a single microphone. However, given that an individual microphone may be susceptible to have a false-positive (e.g., false detection of the voice command) or a false-negative (e.g., unable to detect the voice command) reaction to the voice command, the data bus may be activated prematurely, thus consuming more power, or not be activated timely, thus becoming unresponsive to the voice command.

In this regard, to help improve responsiveness and robustness of data bus activation in the voice-operated electronic device, the host circuit can be configured to activate the data bus based on a cumulative fractional bus activation vote. As used herein, a cumulative fractional bus activation vote is defined to be a collective bus activation vote consisting of the individual bus activation vote submitted by each of the microphones where at least one individual bus activation vote is less than a configurable bus activation threshold, which can be preconfigured or dynamically configurable. In a non-limiting example, if the individual bus activation vote is represented by the specific voltage asserted on the data line, the cumulative fractional bus activation vote will be a cumulative voltage of the specific voltages asserted on the data line by the microphones. For example, the host circuit can be configured to activate the data bus when the cumulative voltage exceeds a configurable bus activation threshold (e.g., 1 volt (V)). Accordingly, a first microphone, a second microphone, and a third microphone may assert, based on a respective detected signal strength of the voice command, respective voltages (e.g., 0.25 V, 0.5 V, and 0.5 V, respectively) on the data line, In this example, the cumulative voltage asserted on the data line would exceed the configurable bus activation threshold of 1 V. Thus, the host circuit will activate the data bus accordingly. In this regard, the host circuit can determine whether to activate the data bus based on collective inputs from the microphones. As a result, it may be possible to improve responsiveness and robustness of bus activation in the voice-operated electronic device.

Notably, the problem and solution discussed above with reference to the voice-operated electronic device are generally applicable to other types of electronic devices, such as a sensor-operated electronic device configured to respond to a detected sensor signal(s). As such, it shall be appreciated that the configuration and operation principles described hereinafter are generally applicable to any type of event-driven electronic devices.

Before discussing exemplary aspects of data bus activation in an electronic device that include specific aspects of the present disclosure, a brief overview of data bus wakeup timing sequences for SLIMbus and SoundWire bus are first provided in FIGS. 1A and 1B, respectively. The discussion of specific exemplary aspects of data bus activation in an electronic device starts below with reference to FIG. 2.

In this regard, FIG. 1A is a schematic diagram of an exemplary data bus wakeup timing sequence 100 for activating a MIPI Alliance SLIMbus (hereinafter "SLIMbus"). According to FIG. 1A, a SLIMbus data signal 102 and a SLIMbus clock signal 104 are communicated on a data line and a clock line of the SLIMbus, respectively. At a superframe boundary 106, the SLIMbus is deactivated and the SLIMbus clock signal 104 is suspended. At time $T_0$, a data bus activation trigger, which may be a voltage trigger for example, is asserted on the data line of the SLIMbus as a request for activating the SLIMbus. After a half-cycle delay from an apparent superframe boundary 108, the SLIMbus clock signal 104 resumes at time $T_1$ and the SLIMbus is activated.

FIG. 1B is a schematic diagram of an exemplary data bus wakeup timing sequence 110 for activating a MIPI Alliance SoundWire (hereinafter "SoundWire") bus. According to FIG. 1B, a SoundWire data signal 112 and a SoundWire clock signal 114 are communicated on a data line and a clock line of the SoundWire bus, respectively. At a stopping frame boundary 116, the SoundWire bus is deactivated and the SoundWire clock signal 114 is suspended. At time $T_0$, a data bus activation trigger, which may be a voltage trigger for example, is asserted on the data line of the SoundWire bus as a request for activating the SoundWire bus. The data bus activation trigger is held HIGH for a minimum of two SoundWire BitSlot durations. Subsequently at time $T_1$, the SoundWire clock signal 114 resumes and the SoundWire bus is activated.

As discussed above, the SLIMbus of FIG. 1A and the SoundWire bus of FIG. 1B can be activated by the data bus activation trigger (e.g., a voltage HIGH) asserted on the respective data lines. Given that the SLIMbus bus is a shared data bus that can be configured to connect to a plurality of SLIMbus device circuits, each of the SLIMbus device circuits can assert the data bus activation trigger, such as the individual bus activation vote discussed above, to activate the SLIMbus. Likewise, given that the SoundWire bus is a shared data bus that can be configured to connect to a plurality of SoundWire device circuits, each of the SoundWire device circuits can assert the data bus activation trigger, such as the individual bus activation vote discussed above, to activate the SoundWire bus.

In some application scenarios, the SoundWire device circuits or the SLIMbus device circuits may be provided in an electronic device, such as the voice-operated electronic device discussed above, to perform a common task. In one exemplary application scenario, a plurality of microphones is connected to a SoundWire bus. The microphones are disposed at different locations and coordinated to detect and respond to such triggering events as a spoken hot word/phrase. In another exemplary application scenario, a plurality of sensors is connected to a SLIMbus. The sensors are disposed at different locations and coordinated to detect and respond to such triggering events as changes in temperature, humidity level, and smoke level. Given that an individual microphone or an individual sensor may have a false-positive (e.g., false detection of the triggering event) or a false-negative (e.g., unable to detect the triggering event) reaction to a triggering event, the SoundWire bus or the SLIMbus may be susceptible to being activated prematurely, thus consuming more power, or not being activated timely, thus becoming unresponsive to a triggering event. As such, it may be desired to activate the SoundWire bus or the SLIMbus based on collective fractional inputs from the microphones or the sensors, thus enabling reliable and responsive data bus activation in an electronic device.

In this regard, FIG. 2 is a schematic diagram of an exemplary electronic device 200 in which a host circuit 202 is configured to activate a clock line 204 in a data bus 206 based on a cumulative fractional bus activation vote $V_C$ asserted on at least one data line 208 in the data bus 206. In an exemplary aspect, the host circuit 202 provides a means for activating the data bus 206. In a non-limiting example, the data bus 206 can be a SoundWire bus or a SLIMbus. The host circuit 202 is configured to determine a cumulative potential $E_C$ representing the cumulative fractional bus activation vote $V_C$ on the data line 208. The host circuit 202 is further configured to activate the clock line 204, thus activating the data bus 206, in response to determining the cumulative potential $E_C$ on the data line 208 being greater than a configurable bus activation threshold $TH_{BUS}$. As is discussed in more detail below, the cumulative fractional bus activation vote $V_C$ is a collective bus activation vote consisting of at least one fractional bus activation vote $V_F$ submitted by at least one selected device circuit 210 among a plurality of device circuits 212(1)-212(N) that are coupled to the data bus 206. In an exemplary aspect, the device circuits 212(1)-212(N) provide a plurality of means for voting and the selected device circuit 210 provides at least one selected means for voting. By determining whether to activate the data bus 206 based on the cumulative fractional bus activation vote $V_C$, the host circuit 202 can overcome the impact of false-positive and/or false-negative triggers, thus enabling data bus activation in the electronic device 200 with improved responsiveness and robustness.

With reference to FIG. 2, the selected device circuit 210 is configured to assert at least one fractional potential $E_F$ representing the fractional bus activation vote $V_F$ on the data line 208. In a non-limiting example, the fractional potential $E_F$ can be provided in the form of voltage, current, conduction, electromagnetic field, etc. For the convenience of illustration, the device circuits 212(1)-212(3) are referenced hereinafter as non-limiting examples of the selected device circuit 210. It shall be appreciated that each of the device circuits 212(1)-212(N) can be the selected device circuit 210. It shall also be appreciated that it is possible to configure one or more of the device circuits 212(1)-212(N) to be the selected device circuit 210.

The selected device circuit 210 is configured to determine a signal strength S of an incoming signal 214, which can be an audio signal (e.g., spoken hot word/phrase) for example. In a non-limiting example, the selected device circuit 210 may determine the signal strength S of the incoming signal 214 by determining the energy of the incoming signal 214, the SNR of the incoming signal 214, and/or matching accuracy of the incoming signal 214. In a non-limiting example, the matching accuracy can be determined by sampling the incoming signal 214 and comparing the sampled incoming signal 214 against pre-stored signal samples. The device circuits 212(1)-212(3) each determine a respective signal strength S of the incoming signal 214. Accordingly, the device circuits 212(1)-212(3) can determine signal strengths $S_1$, $S_2$, and $S_3$, respectively, for the incoming signal 214. Notably, the determined signal strengths $S_1$, $S_2$, and $S_3$ can be identical or different as the device circuits 212(1)-212(3) may receive the incoming signal 214 via the same or different propagation paths.

The selected device circuit 210 is further configured to submit the fractional bus activation vote $V_F$ by asserting the at least one fractional potential $E_F$ corresponding to the determined signal strength S on the data line 208. Accordingly, the device circuit 212(1) is configured to submit a fractional bus activation vote $V_{F1}$ by asserting a fractional potential $E_{F1}$ corresponding to the determined signal strength $S_1$ on the data line 208. The device circuit 212(2) is configured to submit a fractional bus activation vote $V_{F2}$ by asserting a fractional potential $E_{F2}$ corresponding to the determined signal strength $S_2$ on the data line 208. The device circuit 212(3) is configured to submit a fractional bus activation vote $V_{F3}$ by asserting a fractional potential $E_{F3}$ corresponding to the determined signal strength $S_3$ on the data line 208. In this regard, the cumulative potential $E_C$ is an accumulation of the fractional potentials $E_{F1}$, $E_{F2}$, and $E_{F3}$, and the cumulative fractional bus activation vote $V_C$ is an accumulation of the fractional bus activation votes $V_{F1}$, $V_{F2}$, and $V_{F3}$.

Figure 3A:
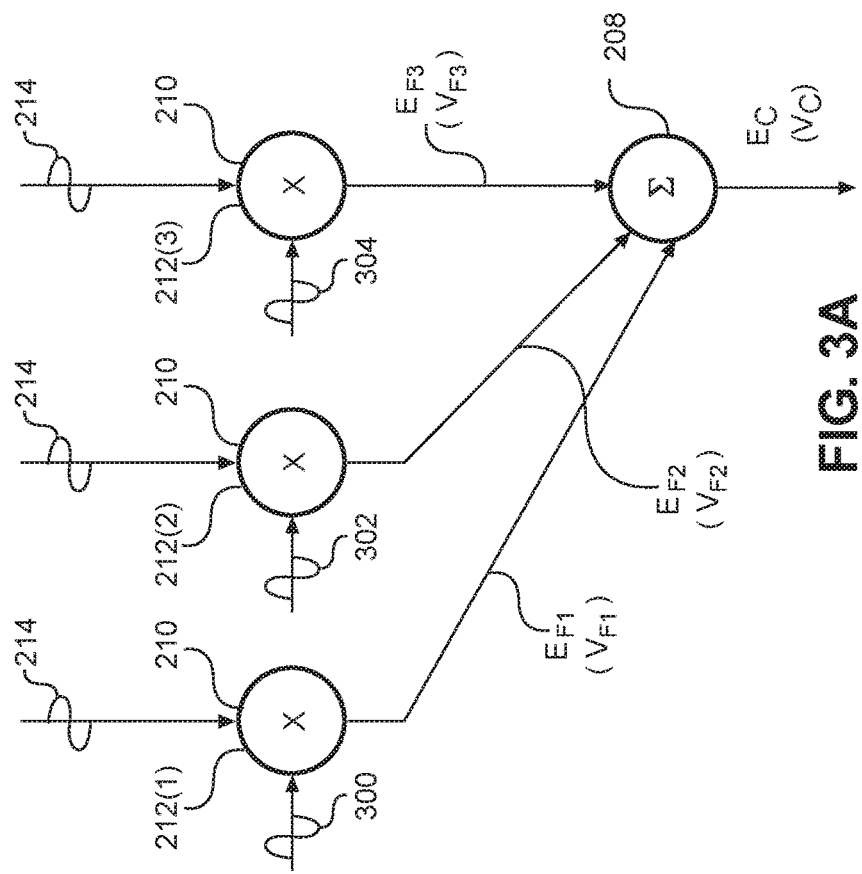
FIG. 3A is a schematic diagram providing an exemplary illustration of a selected device circuit in the electronic device of FIG. 2 configured to determine fractional bus activation votes based on determined signal strengths of an incoming signal.
Figure 3B:
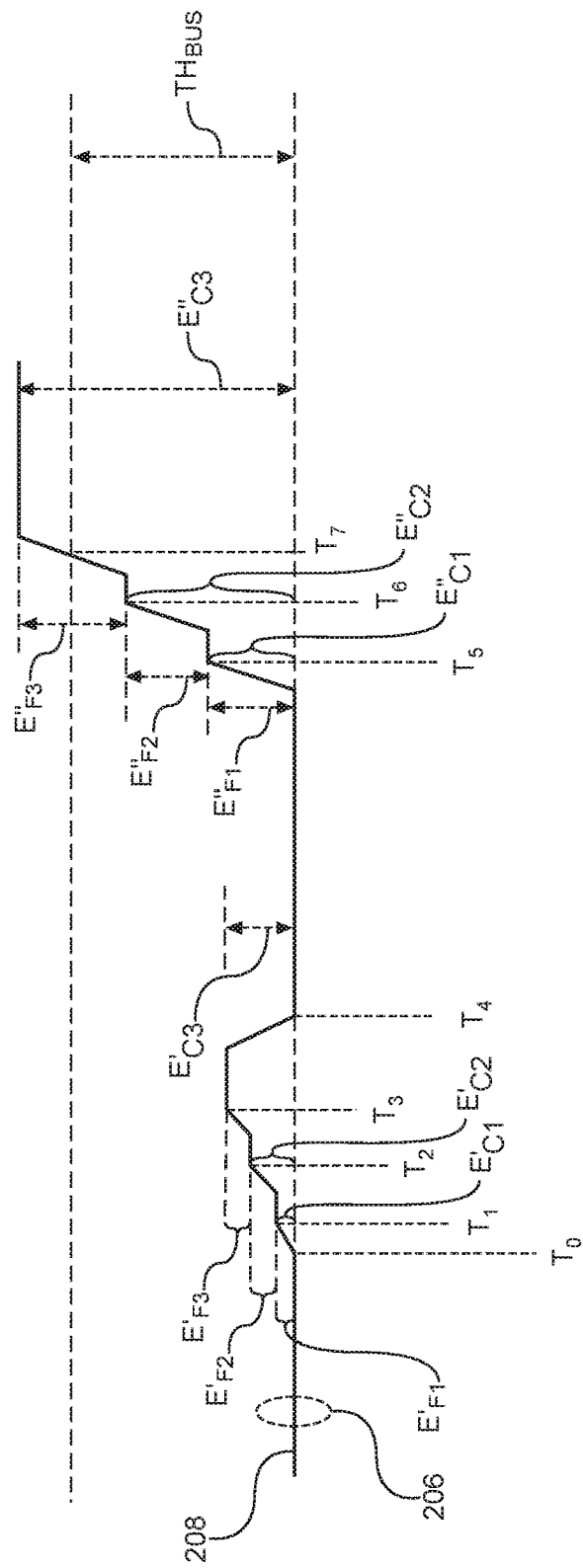
FIG. 3B is a schematic diagram providing an exemplary illustration of the host circuit of FIG. 2 configured to activate the data bus in response to determining a cumulative potential on the at least one data line being greater than a predefined bus activation threshold.

To further illustrate how the selected device circuit 210 submits the fractional bus activation votes $V_{F1}$, $V_{F2}$, and $V_{F3}$, and how the host circuit 202 activates the data bus 206 based on the cumulative fractional bus activation vote $V_C$, FIGS. 3A-3B are discussed next. Common elements between FIGS. 2 and 3A-3B are shown therein with common element numbers and will not be re-described herein.

FIG. 3A is a schematic diagram providing an exemplary illustration of the selected device circuit 210 in the electronic device 200 of FIG. 2 configured to determine the fractional bus activation votes $V_{F1}$, $V_{F2}$, and $V_{F3}$ based on the determined signal strengths $S_1$, $S_2$, and $S_3$ of the incoming signal 214, respectively. With reference to FIG. 3A, the device circuit 212(1) determines the signal strength $S_1$ of the incoming signal 214 and compares the determined signal strength $S_1$ against one or more predefined signal strength thresholds 300 to determine a selected signal strength threshold $S_{TH1}$ that is less than the determined respective signal strength $S_1$. The device circuit 212(2) determines the signal strength $S_2$ of the incoming signal 214 and compares the determined signal strength $S_2$ against one or more predefined signal strength thresholds 302 to determine a selected signal strength threshold $S_{TH2}$ that is less than the determined respective signal strength $S_2$. The device circuit 212(3) determines the signal strength $S_3$ of the incoming signal 214 and compares the determined signal strength $S_3$ against one or more predefined signal strength thresholds 304 to determine a selected signal strength threshold $S_{TH3}$ that is less than the determined respective signal strength $S_3$. In response to determining the selected signal strength threshold $S_{TH1}$, the device circuit 212(1) asserts the fractional potential $E_{F1}$ corresponding to the selected signal strength threshold $S_{TH1}$ on the data line 208. In response to determining the selected signal strength threshold $S_{TH2}$, the device circuit 212(2) asserts the fractional potential $E_{F2}$ corresponding to the selected signal strength threshold $S_{TH2}$ on the data line 208. In response to determining the selected signal strength threshold $S_{TH3}$, the device circuit 212(3) asserts the fractional potential $E_{F3}$ corresponding to the selected signal strength threshold $S_{TH3}$ on the data line 208. The fractional potentials $E_{F1}$, $E_{F2}$, and $E_{F3}$ asserted on the data line 208 represent the fractional bus activation votes $V_{F1}$, $V_{F2}$, and $V_{F3}$, respectively, in the cumulative fractional bus activation vote $V_C$.

In a non-limiting example, the device circuits 212(1)-212(3) can determine the selected signal strength thresholds $S_{TH1}$, $S_{TH2}$, and $S_{TH3}$ and the fractional potentials $E_{F1}$, $E_{F2}$, and $E_{F3}$ based on a fractional potential level lookup table (Table 1) below. As a non-limiting example, Table 1 includes four predefined signal strength thresholds $L_0$, $L_1$, $L_2$, and $L_3$ ($L_3>L_2>L_1>L_0$) corresponding to four predefined fractional potential levels $EL_0$, $EL_1$, $EL_2$, and $EL_3$ ($EL_3>EL_2>EL_1>EL_0$), respectively. Notably, the higher the predefined signal strength threshold is, the higher the corresponding predefined fractional potential level will be. In a non-limiting example, the predefined fractional potential levels $EL_0$, $EL_1$, $EL_2$, and $EL_3$ can be predefined fractional voltage levels. Specific exemplary aspects concerning the predefined fractional voltage levels are discussed later with reference to FIGS. 5A-5B.

TABLE 1

Fractional Potential Level Lookup Table

| Predefined Signal Strength Thresholds (300, 302, 304) ($L_3 > L_2 > L_1 > L_0$) | Fractional Potential Level ($EL_3 > EL_2 > EL_1 > EL_0$) |
| --- | --- |
| $L_3$ | $EL_3$ |
| $L_2$ | $EL_2$ |
| $L_1$ | $EL_1$ |
| $L_0$ | $EL_0$ |

The device circuits 212(1)-212(3) may use Table 1 to help determine the selected fractional potentials $E_{F1}$, $E_{F2}$, and $E_{F3}$, respectively. For example, the device circuit 212(1) determines that the signal strength $S_1$ of the incoming signal 214 is greater than the predefined signal strength thresholds $L_2$, $L_1$, and $L_0$ in Table 1. Accordingly, the device circuit 212(1) selects the predefined signal strength threshold $L_2$ as the selected signal strength threshold $S_{TH1}$. Notably, the selected signal strength threshold $S_{TH1}$, which equals the predefined signal strength threshold $L_2$, is a largest predefined signal strength threshold among the predefined signal strength thresholds $L_0$, $L_1$, $L_2$, and $L_3$ that is less than the determined signal strength $S_1$. Upon determining the selected signal strength threshold $S_{TH1}$, the device circuit 212(1) can select the predefined fractional potential level $EL_2$ corresponding to the predefined signal strength threshold $L_2$ (the selected signal strength threshold $S_{TH1}$) from Table 1. Accordingly, the device circuit 212(1) submits the fractional bus activation vote $V_{F1}$ by asserting the fractional potential $E_{F1}$ at the predefined fractional potential level $EL_1$ on the data line 208. Similarly, the device circuit 212(2) may determine that the signal strength $S_2$ of the incoming signal 214 is greater than the predefined signal strength thresholds $L_1$ and $L_0$ in Table 1. Accordingly, the device circuit 212(2) selects the predefined signal strength threshold $L_1$ (the largest among the predefined signal strength thresholds $L_1$ and $L_0$) as the selected signal strength threshold $S_{TH2}$. Upon determining the selected signal strength threshold $S_{TH2}$, the device circuit 212(2) can select the predefined fractional potential level $EL_1$ corresponding to the predefined signal strength threshold $L_1$ (the selected signal strength threshold $S_{TH2}$) from Table 1. Accordingly, the device circuit 212(2) submits the fractional bus activation vote $V_{F2}$ by asserting the fractional potential $E_{F2}$ at the predefined fractional potential level $EL_1$ on the data line 208. Likewise, the device circuit 212(3) may determine that the signal strength $S_3$ of the incoming signal 214 is greater than the predefined signal strength thresholds $L_0$ in Table 1. Accordingly, the device circuit 212(3) selects the predefined signal strength threshold $L_0$ as the selected signal strength threshold $S_{TH3}$. Upon determining the selected signal strength threshold $S_{TH3}$, the device circuit 212(3) can select the predefined fractional potential level $EL_0$ corresponding to the predefined signal strength threshold $L_0$ (the selected signal strength threshold $S_{TH3}$) from Table 1. Accordingly, the device circuit 212(3) submits the fractional bus activation vote $V_{F3}$ by asserting the fractional potential $E_{F3}$ at the predefined fractional potential level $EL_0$ on the data line 208.

FIG. 3B is a schematic diagram providing an exemplary illustration of the host circuit 202 of FIG. 2 configured to activate the data bus 206 in response to determining the cumulative potential $E_C$ on the data line 208 being greater than the configurable bus activation threshold $TH_{BUS}$. With reference to FIG. 3B, at time $T_0$, the data bus 206 is in an inactive state. At time $T_1$, the device circuit 212(1) asserts a fractional potential $E'_{F1}$ on the data line 208, while the device circuits 212(2), 212(3) remain silent. Accordingly, the host circuit 202 can detect a cumulative potential $E'_{C1}$ equivalent to the fractional potential $E'_{F1}$ on the data line 208. At time $T_2$, the device circuit 212(2) asserts a fractional potential $E'_{F2}$ on the data line 208. At the same time, the device circuit 212(1) maintains assertion of the fractional potential $E'_{F1}$, and the device circuit 212(3) remains silent. Accordingly, the host circuit 202 can detect a cumulative potential $E'_{C2}$ as an accumulation of the fractional potential $E'_{F1}$ and the fractional potential $E'_{F2}$ on the data line 208. At time $T_3$, the device circuit 212(3) asserts a fractional potential $E'_{F3}$ on the data line 208, while the device circuits 212(1), 212(2) maintain respective assertions of the fractional potentials $E'_{F1}$, $E'_{F2}$ on the data line 208. Accordingly, the host circuit 202 can detect a cumulative potential $E'_{C3}$ as an accumulation of the fractional potential $E'_{F1}$, the fractional potential $E'_{F2}$ and the fractional potential $E'_{F3}$ on the data line 208. However, since the cumulative potential $E'_{C3}$ is less than the configurable bus activation threshold $TH_{BUS}$ at time $T_3$, the host circuit 202 will not activate the data bus 206. As a result, the data bus 206 remains in an inactive state at time $T_4$. Notably, in the exemplary illustration discussed above, the device circuits 212(1)-212(3) can assert the fractional potentials $E'_{F1}$, $E'_{F2}$, $E'_{F3}$ in any order. It shall also be appreciated that the device circuits 212(1)-212(3) can also assert the fractional potentials $E'_{F1}$, $E'_{F2}$, $E'_{F3}$ substantially concurrently.

However, at time $T_5$, the device circuit 212(1) asserts a fractional potential $E''_{F1}$ on the data line 208, while the device circuits 212(2), 212(3) remain silent. Accordingly, the host circuit 202 can detect a cumulative potential $E''_{F1}$ equivalent to the fractional potential $E''_{F1}$ on the data line 208. At time $T_6$, the device circuit 212(2) asserts a fractional potential $E''_{F2}$ on the data line 208. At the same time, the device circuit 212(1) maintains assertion of the fractional potential $E''_{F1}$, and the device circuit 212(3) remains silent. Accordingly, the host circuit 202 can detect a cumulative potential $E''_{C2}$ as an accumulation of the fractional potential $E''_{F1}$ and the fractional potential $E''_{F2}$ on the data line 208. At time $T_7$, the device circuit 212(3) asserts a fractional potential $E''_{F3}$ on the data line 208, while the device circuits 212(1), 212(2) maintain respective assertions of the fractional potentials $E''_{F1}$, $E''_{F2}$ on the data line 208. Accordingly, the host circuit 202 can detect a cumulative potential $E''_{F3}$ as an accumulation of the fractional potential $E''_{F1}$, the fractional potential $E''_{F2}$ and the fractional potential $E''_{F3}$ on the data line 208. Because the cumulative potential $E''_{C3}$ is greater than the configurable bus activation threshold $TH_{BUS}$, the host circuit 202 activates the data bus 206 at time $T_7$. Notably, the device circuits 212(1)-212(3) can assert the fractional potentials $E'_{F1}$, $E'_{F2}$, $E'_{F3}$ and the fractional potentials $E''_{F1}$, $E''_{F2}$, $E''_{F3}$ independently. In this regard, the fractional potential $E'_{F1}$ can be the same as or different from the fractional potential $E''_{F1}$, the fractional potential $E'_{F2}$ can be the same as or different from the fractional potential $E''_{F2}$, and the fractional potential $E'_{F3}$ can be the same as or different from the fractional potential $E''_{F3}$.

The electronic device 200 can be configured to activate the data bus 206 based on a process. In this regard, FIG. 4 is a flowchart of an exemplary process 400 that the electronic device 200 of FIG. 2 can perform to activate the data bus 206. According to the process 400, the selected device circuit 210 among the device circuits 212(1)-212(N) coupled to the data bus 206 determines the signal strengths $S_1$, $S_2$, $S_3$ of the incoming signal 214 (block 402). The selected device circuit 210 compares the determined signal strength $S_1$, $S_2$, $S_3$ against the predefined signal strength thresholds 300, 302, 304 to determine the selected signal strength threshold $S_{TH1}$, $S_{TH2}$, $S_{TH3}$ among the predefined signal strength thresholds 300, 302, 304 (block 404). Notably, the selected signal strength threshold $S_{TH1}$, $S_{TH2}$, $S_{TH3}$ is less than the determined signal strengths $S_1$, $S_2$, $S_3$, respectively. Next, the selected device circuit 210 asserts the fractional potential $E_{F1}$, $E_{F2}$, $E_{F3}$ corresponding to the selected signal strength threshold $S_{TH1}$, $S_{TH2}$, $S_{TH3}$ on the data line 208 in response to determining the selected signal strength threshold $S_{TH1}$, $S_{TH2}$, $S_{TH3}$ (block 406). Notably, the fractional potential $E_{F1}$, $E_{F2}$, $E_{F3}$ represents the fractional bus activation vote $V_{F1}$, $V_{F2}$, $V_{F3}$ in the cumulative fractional bus activation vote $V_C$.

The host circuit 202 determines the cumulative potential $E_C$ representing the cumulative fractional bus activation vote $V_C$ on the data line 208 in the data bus 206 (block 408). The host circuit 202 activates the clock line 204 in the data bus 206 in response to determining the cumulative potential $E_C$ on the data line 208 being greater than the configurable bus activation threshold $TH_{BUS}$ (block 410). Notably, the host circuit 202 can activate the data bus 206 independent from the processing steps 402, 404, and 406 as described above.

Figure 5A:
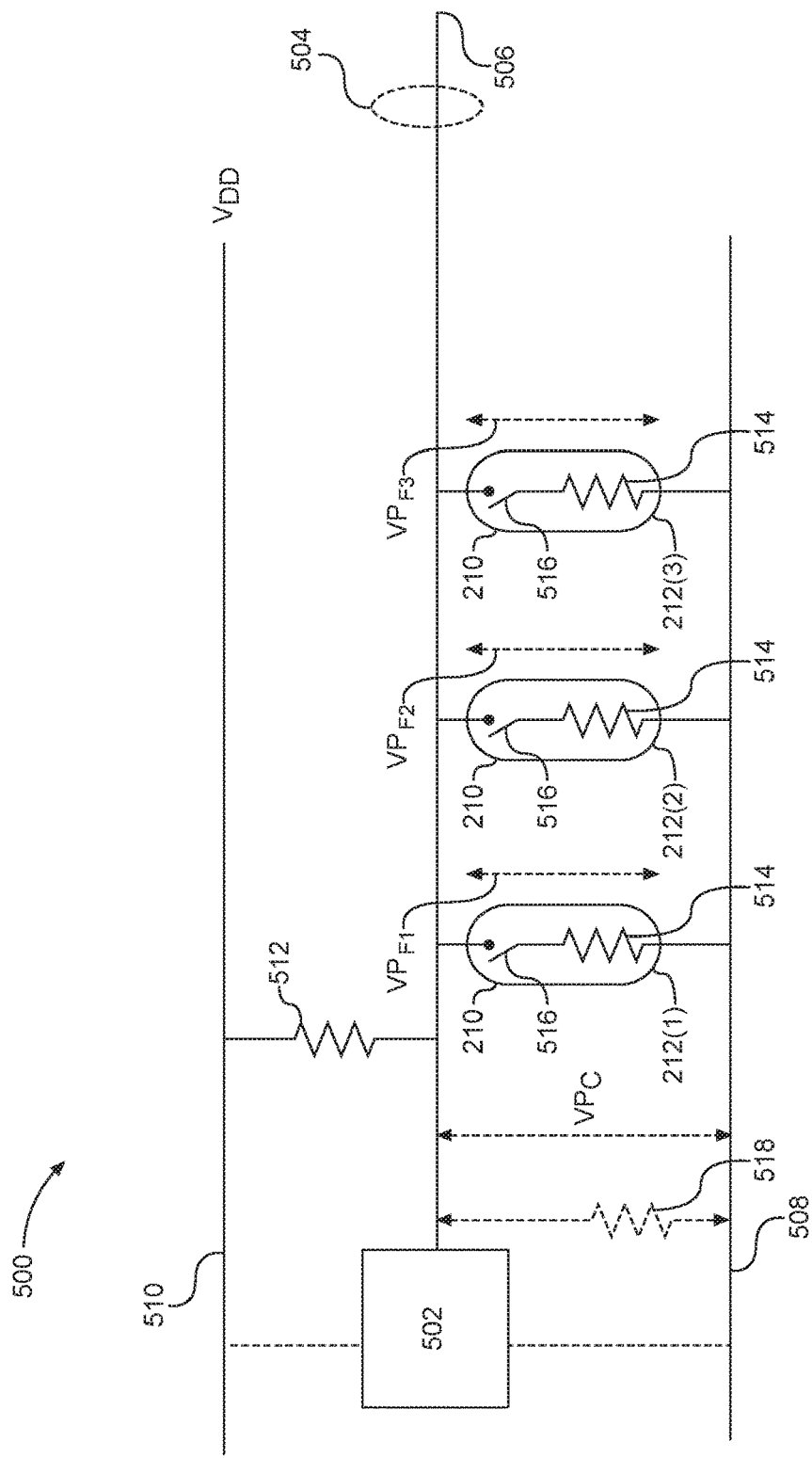
FIG. 5A is a schematic diagram of an exemplary electronic device in which a host circuit is configured to activate a data bus based on a positive cumulative voltage asserted between at least one data line in the data bus and a ground rail.

With reference back to FIG. 2, in a non-limiting example, the selected device circuit 210 can assert the fractional potentials $E_{F1}$, $E_{F2}$, and $E_{F3}$ as fractional voltages. Accordingly, the host circuit 202 determines the cumulative potential $E_C$ as a cumulative voltage. In this regard, FIG. 5A is a schematic diagram of an exemplary electronic device 500 in which a host circuit 502 is configured to activate a data bus 504 based on a positive cumulative voltage $VP_C$ asserted between at least one data line 506 in the data bus 504 and a ground rail 508. Common elements between FIGS. 2 and 5A are shown therein with common element numbers and will not be re-described herein.

With reference to FIG. 5A, the data line 506 is coupled between a supply rail 510 and the ground rail 508. In a non-limiting example, the supply rail 510 is coupled to a positive supply voltage $V_{DD}$. The data line 506 may be coupled to the supply rail 510 via a pull resistor 512. The pull resistor 512 raises the positive cumulative voltage $VP_C$ closer to the positive supply voltage $V_{DD}$ when the data bus 504 is inactive.

The device circuit 212(1) is configured to assert a positive fractional voltage $VP_{F1}$ corresponding to the selected signal strength threshold $S_{TH1}$ between the data line 506 and the ground rail 508. Similarly, the device circuit 212(2) asserts a positive fractional voltage $VP_{F2}$ corresponding to the selected signal strength threshold $S_{TH2}$ between the data line 506 and the ground rail 508. Likewise, the device circuit 212(3) asserts a positive fractional voltage $VP_{F3}$ corresponding to the selected signal strength threshold $S_{TH3}$ between the data line 506 and the ground rail 508. In this regard, the positive cumulative voltage $VP_C$ is an accumulation of the positive fractional voltages $VP_{F1}$, $VP_{F2}$, and $VP_{F3}$.

In one aspect, the device circuits 212(1)-212(3) each include an adjustable resistor 514. In this regard, the device circuits 212(1)-212(3) can assert different positive fractional voltages $VP_{F1}$, $VP_{F2}$, and $VP_{F3}$, respectively, by adjusting the respective adjustable resistor 514. In another aspect, the device circuits 212(1)-212(3) each include one or more controllable switches 516. The controllable switches 516 can be individually controlled to cause the positive fractional voltages $VP_{F1}$, $VP_{F2}$, and $VP_{F3}$ to be asserted between the data line 506 and the ground rail 508. When the controllable switches 516 in the device circuits 212(1)-212(3) are all in an open position, the positive cumulative voltage $VP_C$ equals the positive supply voltage $V_{DD}$. The positive cumulative voltage $VP_C$ will be reduced accordingly when any of the controllable switches 516 in any of the device circuits 212(1)-212(3) are closed. In this regard, each closing of the controllable switches 516 in the device circuits 212(1)-212(3) will lower the positive cumulative voltage $VP_C$ continuously, until the host circuit 502 activates the data bus 504. For example, if the host circuit 502 is configured to activate the data bus 504 when the positive cumulative voltage $VP_C$ equals $\frac{1}{4}V_{DD}$, then the device circuits 212(1)-212(3) would need to lower the positive cumulative voltage $VP_C$ by $\frac{3}{4}V_{DD}$ to cause the data bus 504 to be activated.

In another aspect, it may be possible to lower the positive cumulative voltage $VP_C$ when the controllable switches 516 in the device circuits 212(1)-212(3) are all in an open position, thus helping to improve overall sensitivity of the electronic device 500. For example, it is possible to provide a resistor 518 between the data line 506 and the ground rail 508. In this regard, the pull resistor 512 and the resistor 518 will form a voltage divider to divide the positive supply voltage $V_{DD}$. In a non-limiting example, if the pull resistor 512 and the resistor 518 have equal resistances, then the positive cumulative voltage $VP_C$ would be reduced to $\frac{1}{2}V_{DD}$ when all of the controllable switches 516 are in an open position. In this regard, if the host circuit 502 is configured to activate the data bus 504 when the positive cumulative voltage $VP_C$ equals $\frac{1}{4}V_{DD}$, then the device circuits 212(1)-212(3) would need to lower the positive cumulative voltage $VP_C$ by $\frac{1}{4}V_{DD}$ to cause the data bus 504 to be activated. As a result, it is possible to control overall sensitivity of the electronic device 500. The resistor 518 may be selected with predetermined resistance to bring the positive cumulative voltage $VP_C$ to a desired level when all of the controllable switches 516 in the device circuits 212(1)-212(3) are in an open position.

Figure 5B:
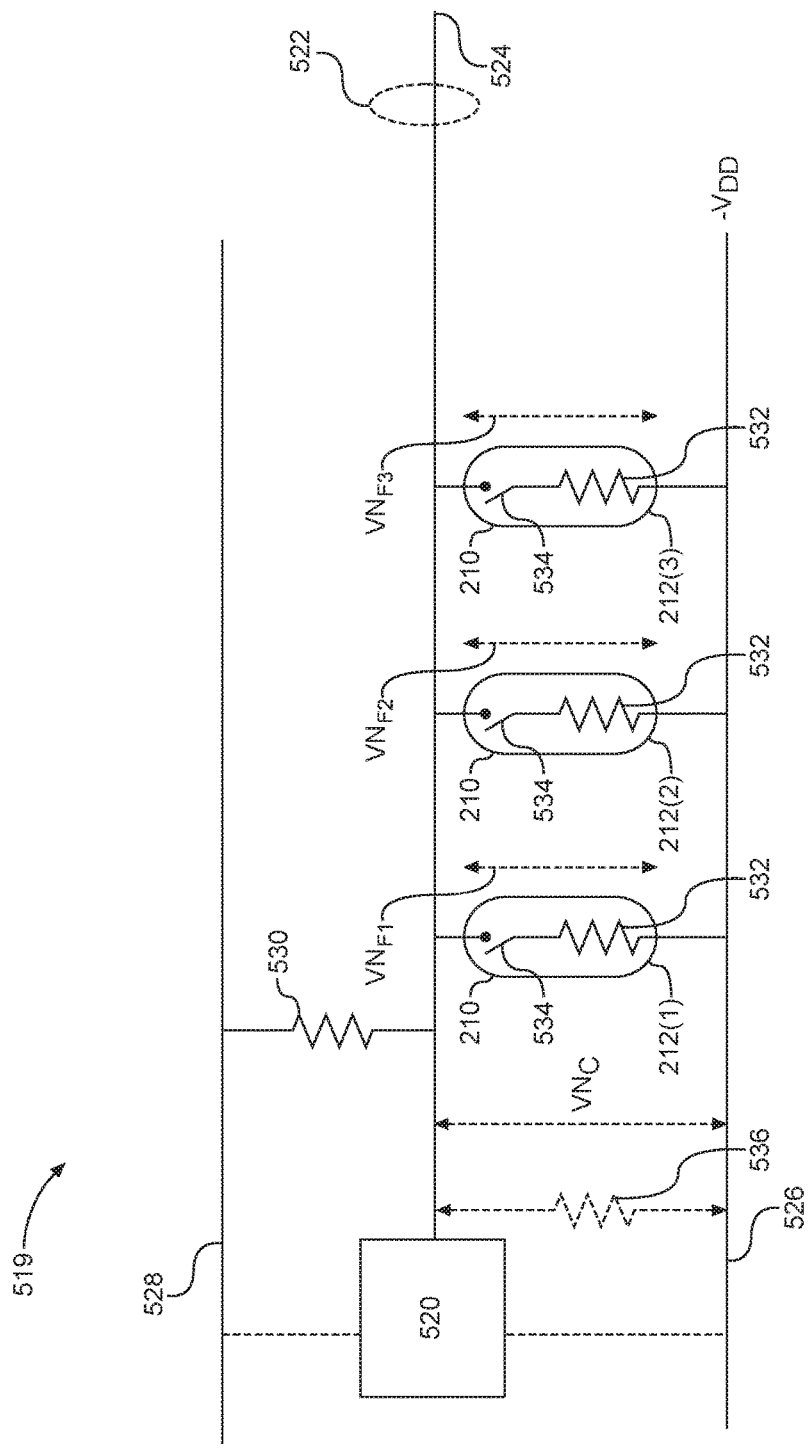
FIG. 5B is a schematic diagram of an exemplary electronic device in which a host circuit is configured to activate a data bus based on a negative cumulative voltage asserted between at least one data line in the data bus and a supply rail.

FIG. 5B is a schematic diagram of an exemplary electronic device 519 in which a host circuit 520 is configured to activate a data bus 522 based on a negative cumulative voltage $VN_C$ asserted between at least one data line 524 in the data bus 522 and a supply rail 526. Common elements between FIGS. 2 and 5B are shown therein with common element numbers and will not be re-described herein.

With reference to FIG. 5B, the data line 524 is coupled between the supply rail 526 and a ground rail 528. In a non-limiting example, the supply rail 526 is coupled to a negative supply voltage $-V_{DD}$. The data line 524 may be coupled to the ground rail 528 via a pull resistor 530. The pull resistor 530 causes the negative cumulative voltage $VN_C$, which is measured between the data line 524 and the supply rail 526, to be closer to the negative supply voltage $-V_{DD}$ when the data bus 522 is inactive.

The device circuit 212(1) is configured to assert a negative fractional voltage $VN_{F1}$ corresponding to the selected signal strength threshold $S_{TH1}$ between the data line 524 and the supply rail 526. Similarly, the device circuit 212(2) asserts a negative fractional voltage $VN_{F2}$ corresponding to the selected signal strength threshold $S_{TH2}$ between the data line 524 and the supply rail 526. Likewise, the device circuit 212(3) asserts a negative fractional voltage $VN_{F3}$ corresponding to the selected signal strength threshold $S_{TH3}$ between the data line 524 and the supply rail 526. In this regard, the negative cumulative voltage $VN_C$ is an accumulation of the negative fractional voltages $VN_{F1}$, $VN_{F2}$, and $VN_{F3}$.

In one aspect, the device circuits 212(1)-212(3) each include an adjustable resistor 532. In this regard, the device circuits 212(1)-212(3) can assert different negative fractional voltages $VN_{F1}$, $VN_{F2}$, and $VN_{F3}$, respectively, by adjusting the respective adjustable resistor 532. In another aspect, the device circuits 212(1)-212(3) each include one or more controllable switches 534. The controllable switches 534 can be individually controlled to cause the negative fractional voltages $VN_{F1}$, $VN_{F2}$, and $VN_{F3}$ to be asserted between the data line 524 and the supply rail 526. When the controllable switches 534 in the device circuits 212(1)-212(3) are all in an open position, the negative cumulative voltage $VN_C$ equals the negative supply voltage $-V_{DD}$. The negative cumulative voltage $VN_C$ will be increased accordingly when any of the controllable switches 534 in any of the device circuits 212(1)-212(3) are closed. In this regard, each closing of the controllable switches 534 in the device circuits 212(1)-212(3) will increase the negative cumulative voltage $VN_C$ continuously, until the host circuit 520 activates the data bus 522. For example, if the host circuit 520 is configured to activate the data bus 522 when the negative cumulative voltage $VN_C$ equals $-\frac{1}{4}V_{DD}$, then the device circuits 212(1)-212(3) would need to increase the negative cumulative voltage $VN_C$ by $-\frac{3}{4}V_{DD}$ to cause the data bus 522 to be activated.

In another aspect, it may be possible to raise the negative cumulative voltage $VN_C$ when the controllable switches 534 in the device circuits 212(1)-212(3) are all in an open position, thus helping to improve overall sensitivity of the electronic device 519. For example, it is possible to provide a resistor 536 between the data line 524 and the supply rail 526. In this regard, the pull resistor 530 and the resistor 536 will form a voltage divider to divide the negative supply voltage $-V_{DD}$. In a non-limiting example, if the pull resistor 530 and the resistor 536 have equal resistances, then the negative cumulative voltage $VN_C$ would be reduced to $-\frac{1}{2}V_{DD}$ when all of the controllable switches 534 are in an open position. In this regard, if the host circuit 520 is configured to activate the data bus 522 when the negative cumulative voltage $VN_C$ equals $-\frac{1}{4}V_{DD}$ then the device circuits 212(1)-212(3) would need to increase the negative cumulative voltage $VN_C$ by $-\frac{1}{4}V_{DD}$ to cause the data bus 522 to be activated. As a result, it is possible to control overall sensitivity of the electronic device 519. The resistor 536 may be selected with predetermined resistance to bring the negative cumulative voltage $VN_C$ to a desired level when all of the controllable switches 534 in the device circuits 212(1)-212(3) are in an open position.

Figure 6:
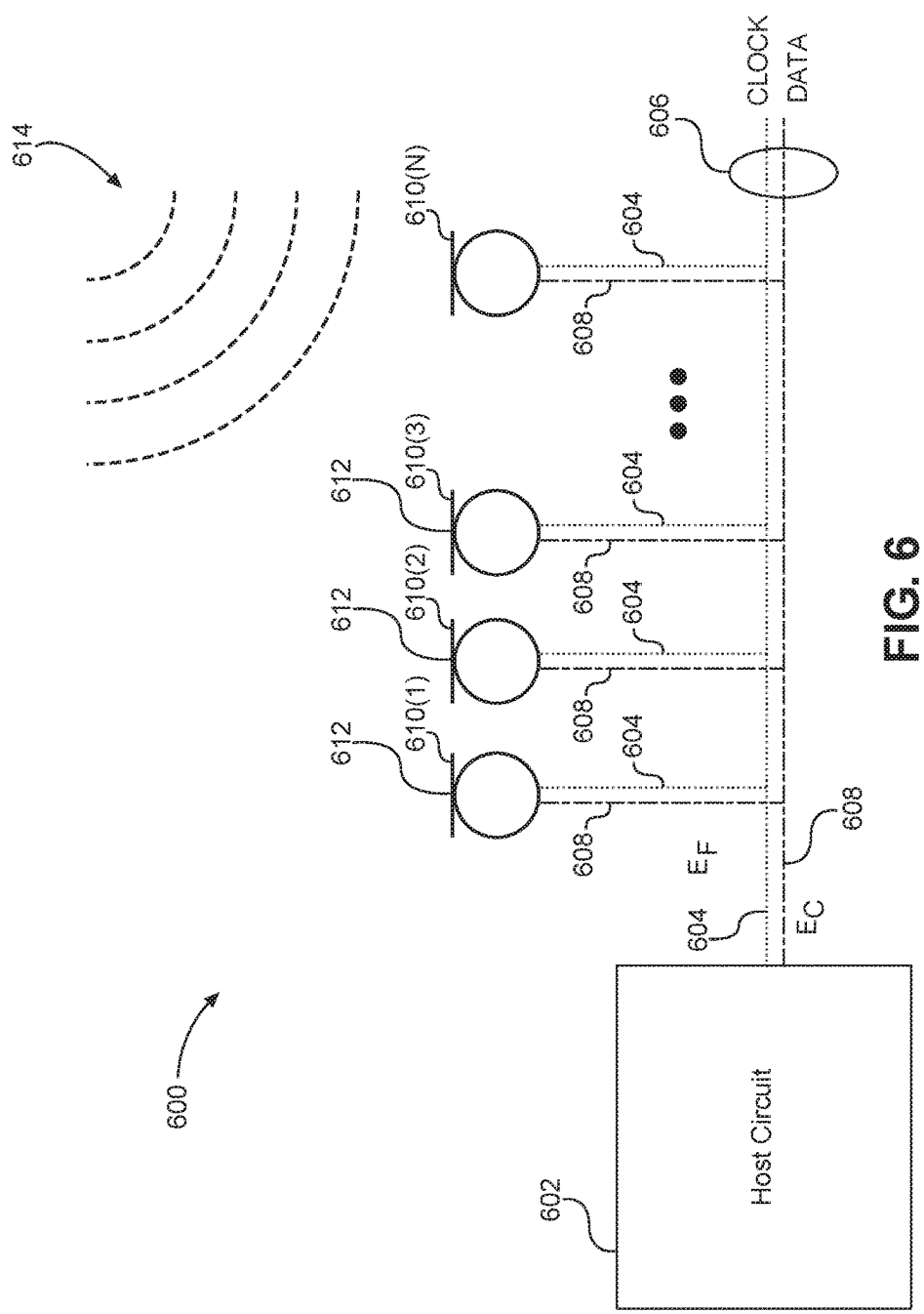
FIG. 6 is a schematic diagram of an exemplary voice-operated electronic device in which a host circuit is configured to activate a clock line in a data bus based on a cumulative fractional bus activation vote asserted on at least one data line in the data bus.

In an exemplary aspect, the device circuits 212(1)-212(N) in the electronic device 200 of FIG. 2 can be microphones configured to detect and respond to audio input signals collectively. In this regard, FIG. 6 is a schematic diagram of an exemplary voice-operated electronic device 600 in which a host circuit 602 is configured to activate a clock line 604 in a data bus 606 based on a cumulative fractional bus activation vote $V_C$ asserted on at least one data line 608 in the data bus 606. In an exemplary aspect, the host circuit 602 provides a means for activating the data bus 606.

With reference to FIG. 6, the voice-operated electronic device 600 includes a plurality of microphones 610(1)-610(N). In an exemplary aspect, the microphones 610(1)-610(N) can also provide a plurality of means for voting. The microphones 610(1)-610(N) are disposed at different locations and are coupled to the data bus 606. At least one selected microphone 612 among the microphones 610(1)-610(N) is configured to determine a matching level of a hot word in an incoming audio signal 614. In an exemplary aspect, the selected microphone 612 also provides at least one selected means for voting. The selected microphone 612 compares the determined matching level of the hot word against one or more predefined matching level thresholds to determine a selected matching level threshold among the predefined matching level thresholds that is less than the determined matching level of the hot word. The selected microphone 612 is further configured to assert at least one fractional potential $E_F$ corresponding to the selected matching level threshold on the data line 608 in response to determining the selected matching level threshold among the predefined matching level thresholds.

The selected microphone 612 can be configured to assert the fractional potential $E_F$ according a process. In this regard, FIG. 7 is a flowchart of an exemplary process 700 that the selected microphone 612 in the voice-operated electronic device 600 of FIG. 6 can employ to assert the fractional potential $E_F$ according to various matching levels of the hot word in the incoming audio signal 614.

Figure 7:
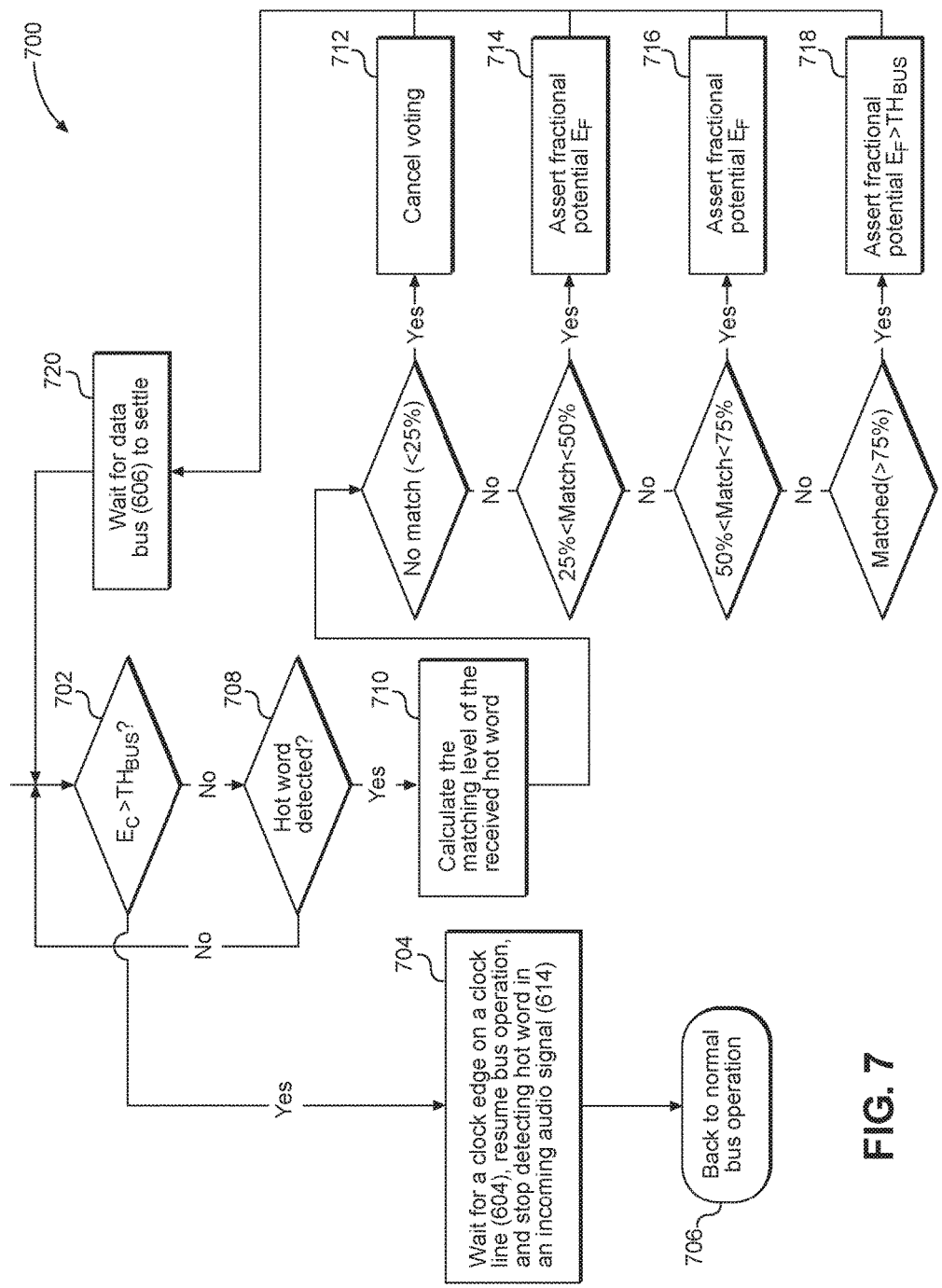
FIG. 7 is a flowchart of an exemplary process that a selected microphone in the voice-operated electronic device of FIG. 6 can employ to assert a fractional potential according to various matching levels of a hot word in an incoming audio signal.

With reference to FIG. 7, the selected microphone 612 first determines whether the cumulative potential $E_C$ on the data line 608 is greater than the configurable bus activation threshold $TH_{BUS}$ (block 702). If the cumulative potential $E_C$ on the data line 608 is determined to be greater than the configurable bus activation threshold $TH_{BUS}$, the selected microphone 612 waits for a clock edge on the clock line 604, resumes bus operation, and stops detecting the hot word in the incoming audio signal 614 (block 704). The selected microphone 612 subsequently goes back to normal bus operation (block 706).

If the cumulative potential $E_C$ on the data line 608 is determined to be less than or equal to the configurable bus activation threshold $TH_{BUS}$, the selected microphone 612 then determines whether the hot word in the incoming audio signal 614 is detected (block 708). If the selected microphone 612 does not detect the hot word, then the process 700 returns to block 702. If the selected microphone 612 detects the hot word, the selected microphone 612 calculates the matching level of the received hot word (block 710). In a non-limiting example, the selected microphone 612 determines the matching level by sampling the hot word in the incoming audio signal 614 and comparing the sampled hot word against pre-stored hot word samples. In this regard, the matching level is a measure of similarities between the sampled hot word and the pre-stored hot word samples. If the matching level is less than a 25% matching level threshold, the selected microphone 612 cancels bus activation voting (block 712). If the matching level is greater than the 25% matching level threshold but less than a 50% matching level threshold, the selected microphone 612 asserts a fractional potential $E_F$ corresponding to the 50% matching level threshold (block 714). If the matching level is greater than the 50% matching level threshold but less than a 75% matching level threshold, the selected microphone 612 asserts a fractional potential $E_F$ corresponding to the 75% matching level threshold (block 716). If the matching level is greater than the 75% matching level threshold, the selected microphone 612 asserts a fractional potential $E_F$ greater than the configurable bus activation threshold $TH_{BUS}$ (block 718). In response, the host circuit 602 will activates the clock line 604. The selected microphone 612 then waits for the data bus 606 to settle (block 720). Notably, the electronic device 200 of FIG. 2 can employ the process 700 as well.

Alternative to asserting the fractional potential $E_F$ based on the determined matching level of the hot word, the selected microphone 612 may assert a constant fractional potential $E_F$ upon detecting the hot word in the incoming audio signal 614. In this regard, FIG. 8 is a flowchart of an exemplary simplified process 800 that the selected microphone 612 in the voice-operated electronic device 600 of FIG. 6 can employ to assert a constant fractional potential $E_F$ in response to detecting the hot word in the incoming audio signal 614.

Figure 8:
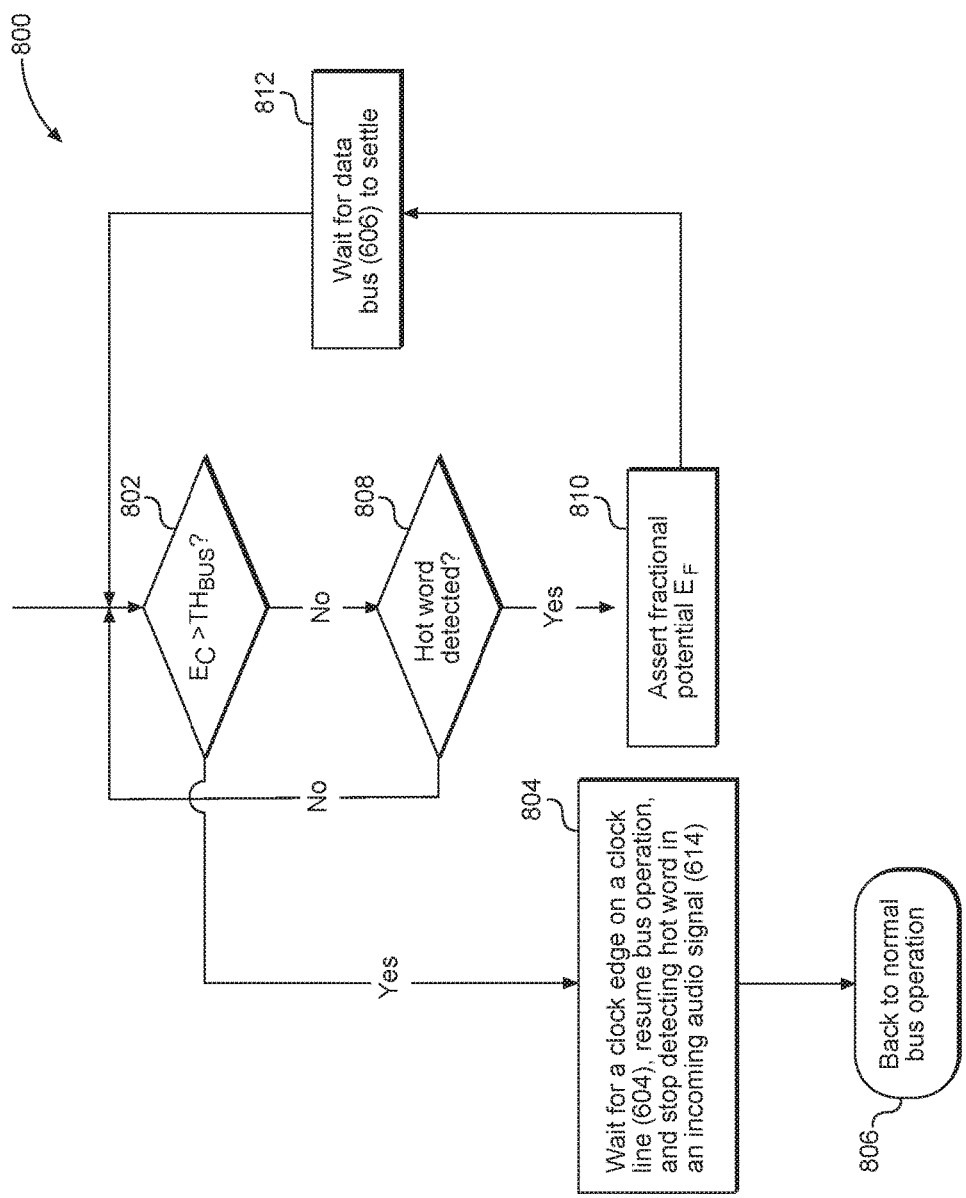
FIG. 8 is a flowchart of an exemplary process that a selected microphone in the voice-operated electronic device of FIG. 6 can employ to assert a constant fractional potential in response to detecting a hot word in an incoming audio signal.

With reference to FIG. 8, the selected microphone 612 first determines whether the cumulative potential $E_C$ on the data line 608 is greater than the configurable bus activation threshold $TH_{BUS}$ (block 802). If the cumulative potential $E_C$ on the data line 608 is determined to be greater than the configurable bus activation threshold $TH_{BUS}$, the selected microphone 612 waits for a clock edge on the clock line 604, resumes bus operation, and stops detecting the hot word in the incoming audio signal 614 (block 804). The selected microphone 612 subsequently goes back to normal bus operation (block 806). If the cumulative potential $E_C$ on the data line 608 is determined to be less than or equal to the configurable bus activation threshold $TH_{BUS}$, the selected microphone 612 then determines whether the hot word in the incoming audio signal 614 is detected (block 808). If the selected microphone 612 does not detect the hot word, then the process 800 returns to block 802. If the hot word is detected, the selected microphone 612 asserts the constant fractional potential $E_F$, which may be greater than the configurable bus activation threshold $TH_{BUS}$, on the data line 608 (block 810). In a non-limiting example, the host circuit 602 is able to determine how many bus activation votes are asserted based on the cumulative potential $E_C$ asserted on the data line 608. If the constant fractional potential $E_F$ equals 0.1 volts (V) and the host circuit 602 determines that the cumulative potential $E_C$ is 0.4 V, the host circuit 602 can thus conclude that four bus activation votes have been submitted. As such, the configurable bus activation threshold $TH_{BUS}$ can be defined as a count of bus activation votes. The selected microphone 612 then waits for the data bus 606 to settle (block 812). Notably, the electronic device 200 of FIG. 2 can employ the simplified process 800 as well.

In one exemplary aspect, the selected microphone 612 can be a legacy microphone incapable of determining the matching level of the hot word in the incoming audio signal 614. In this regard, FIG. 9 is a flowchart of an exemplary legacy process 900 that the selected microphone 612 in the voice-operated electronic device 600 of FIG. 6 can perform to activate the data bus 606.

Figure 9:
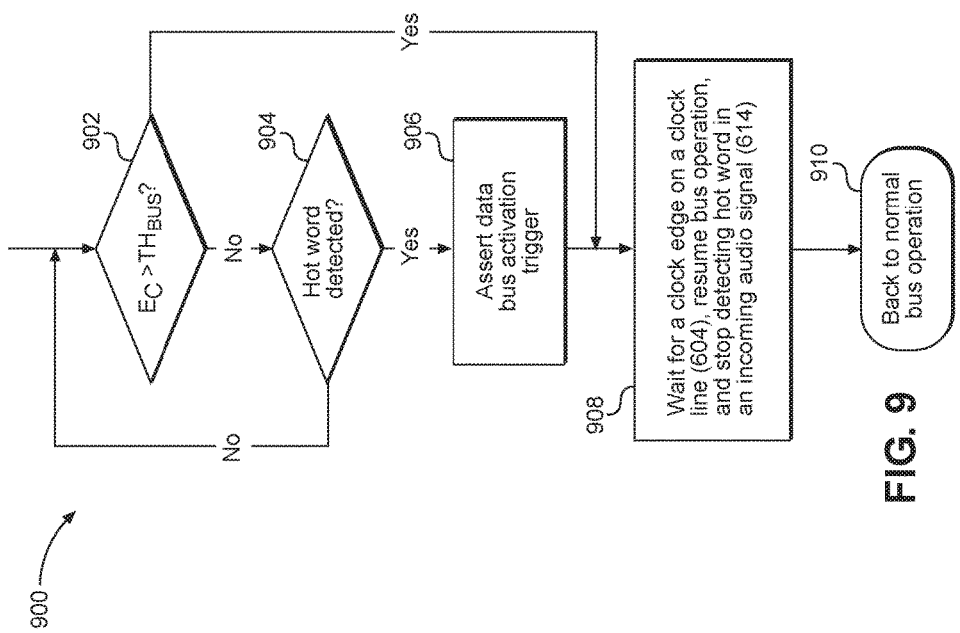
FIG. 9 is a flowchart of an exemplary legacy process that a selected microphone in the voice-operated electronic device of FIG. 6 can perform to activate the data bus.

With reference to FIG. 9, the selected microphone 612 first determines whether the cumulative potential $E_C$ on the data line 608 is greater than the configurable bus activation threshold $TH_{BUS}$ (block 902). If the cumulative potential $E_C$ on the data line 608 is determined to be less than or equal to the configurable bus activation threshold $TH_{BUS}$, the selected microphone 612 then determines whether the hot word in the incoming audio signal 614 is detected (block 904). If the selected microphone 612 does not detect the hot word, the process 900 returns to block 902. If the hot word is detected, the selected microphone 612 asserts a data bus activation trigger, such as the data bus activation trigger previously discussed in FIGS. 1A and 1B, on the data line 608 (block 906). The selected microphone 612 then waits for a clock edge on the clock line 604, resumes bus operation, and stops detecting the hot word in the incoming audio signal 614 (block 908). The selected microphone 612 subsequently goes back to normal bus operation (block 910). If the cumulative potential $E_C$ on the data line 608 is determined to be greater than the configurable bus activation threshold $TH_{BUS}$ in block 902, the selected microphone 612 then jumps to block 908. The legacy process 900 enables the voice-operated electronic device 600 to be backward compatible with the SLIMbus and SoundWire bus activation mechanisms described in FIGS. 1A and 1B.

Data bus activation in an electronic device according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 10:
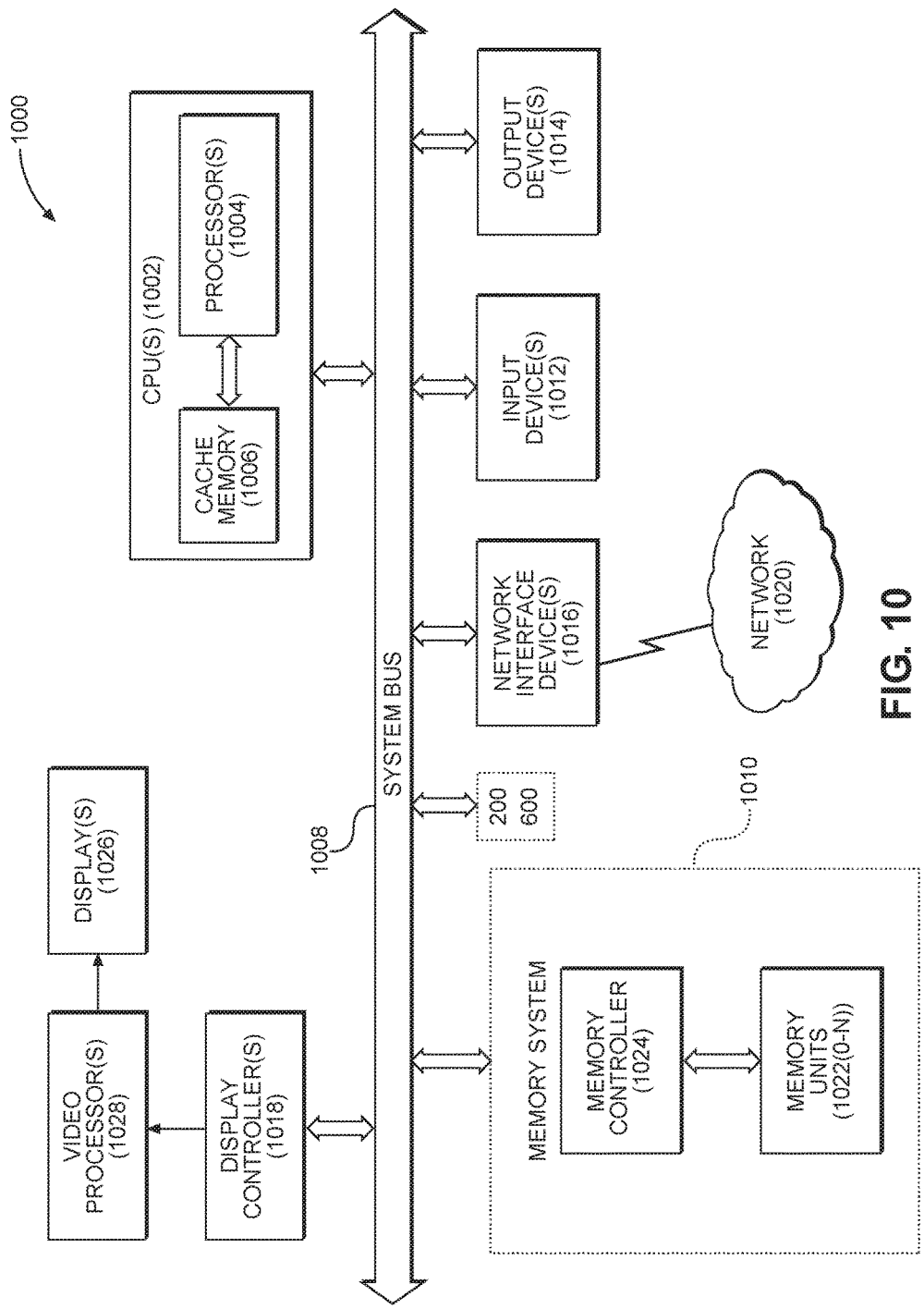
FIG. 10 illustrates an exemplary processor-based system that can support the electronic device of FIG. 2 and the voice-operated electronic device of FIG. 6.

In this regard, FIG. 10 illustrates an exemplary processor-based system 1000 that can support the electronic device 200 of FIG. 2 and the voice-operated electronic device 600 of FIG. 6. In this example, the processor-based system 1000 includes one or more central processing units (CPUs) 1002, each including one or more processors 1004. The CPU(s) 1002 may have cache memory 1006 coupled to the processor(s) 1004 for rapid access to temporarily stored data. The CPU(s) 1002 is coupled to a system bus 1008. As is well known, the CPU(s) 1002 communicates with other devices by exchanging address, control, and data information over the system bus 1008. Although not illustrated in FIG. 10, multiple system buses 1008 could be provided, wherein each system bus 1008 constitutes a different fabric.

Other master and slave devices can be connected to the system bus 1008. As illustrated in FIG. 10, these devices can include a memory system 1010, one or more input devices 1012, one or more output devices 1014, one or more network interface devices 1016, and one or more display controllers 1018, as examples. The input device(s) 1012 can include any type of input device, including, but not limited to, input keys, switches, voice processors, etc. The output device(s) 1014 can include any type of output device, including, but not limited to, audio, video, other visual indicators, etc. The network interface device(s) 1016 can be any device configured to allow exchange of data to and from a network 1020. The network 1020 can be any type of network, including, but not limited to, a wired or wireless network, a private or public network, a local area network (LAN), a wireless local area network (WLAN), a wide area network (WAN), a BLUETOOTH™ network, or the Internet. The network interface device(s) 1016 can be configured to support any type of communications protocol desired. The memory system 1010 can include one or more memory units 1022 (0-N) and a memory controller 1024.

The CPU(s) 1002 may also be configured to access the display controller(s) 1018 over the system bus 1008 to control information sent to one or more displays 1026. The display controller(s) 1018 sends information to the display(s) 1026 to be displayed via one or more video processors 1028, which process the information to be displayed into a format suitable for the display(s) 1026. The display(s) 1026 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An electronic device comprising:
   a host circuit configured to be coupled to a data bus comprising a clock line and at least one data line, wherein the host circuit is further configured to:
      determine a cumulative potential representing a cumulative fractional bus activation vote on the at least one data line; and
      activate the clock line in response to determining the cumulative potential on the at least one data line being greater than a configurable bus activation threshold; and
   a plurality of device circuits coupled to the data bus, wherein at least one selected device circuit among the plurality of device circuits is configured to:
      determine a signal strength of an incoming signal;
      compare the determined signal strength against one or more predefined signal strength thresholds to determine a selected signal strength threshold among the one or more predefined signal strength thresholds, wherein the selected signal strength threshold is less than the determined signal strength; and
      assert at least one fractional potential corresponding to the selected signal strength threshold on the at least one data line in response to determining the selected signal strength threshold, wherein the at least one fractional potential represents at least one fractional bus activation vote in the cumulative fractional bus activation vote.

2. The electronic device of claim 1, wherein the at least one data line is coupled to a supply rail and a ground rail in the electronic device.

3. The electronic device of claim 2, wherein the host circuit is configured to determine the cumulative potential based on a positive cumulative voltage asserted between the at least one data line and the ground rail.

4. The electronic device of claim 2, wherein the host circuit is configured to determine the cumulative potential based on a negative cumulative voltage asserted between the at least one data line and the supply rail.

5. The electronic device of claim 1, wherein the data bus comprises a bus selected from the group consisting of: a MIPI Alliance SoundWire bus; and a Mobile Industry Processor Interface (MIPI) Alliance Serial Low-power Interchip Media Bus (SLIMbus).

6. An electronic device comprising:
a plurality of device circuits configured to be coupled to a data bus comprising a clock line and at least one data line, wherein at least one selected device circuit among the plurality of device circuits is configured to:
  determine a signal strength of an incoming signal;
  compare the determined signal strength against one or more predefined signal strength thresholds to determine a selected signal strength threshold among the one or more predefined signal strength thresholds, wherein the selected signal strength threshold is less than the determined signal strength; and
  assert at least one fractional potential corresponding to the selected signal strength threshold on the at least one data line in response to determining the selected signal strength threshold, wherein the at least one fractional potential represents at least one fractional bus activation vote from the at least one selected device circuit; and
a host circuit coupled to the data bus and configured to:
  determine a cumulative potential representing a cumulative fractional bus activation vote on the at least one data line; and
  activate the clock line in response to determining the cumulative potential on the at least one data line being greater than a configurable bus activation threshold.

7. The electronic device of claim 6, wherein the at least one selected device circuit is configured to determine the selected signal strength threshold by selecting a largest predefined signal strength threshold that is less than the determined signal strength.

8. The electronic device of claim 6, wherein the at least one selected device circuit is configured to determine the signal strength of the incoming signal based on determined potential of the incoming signal.

9. The electronic device of claim 6, wherein the at least one selected device circuit is configured to determine the signal strength of the incoming signal based on determined signal-to-noise ratio (SNR) of the incoming signal.

10. The electronic device of claim 6, wherein the at least one selected device circuit is configured to determine the signal strength of the incoming signal based on determined matching accuracy of the incoming signal.

11. The electronic device of claim 6, wherein the at least one data line is coupled to a supply rail and a ground rail in the electronic device.

12. The electronic device of claim 11, wherein the at least one selected device circuit is configured to assert a positive fractional voltage corresponding to the selected signal strength threshold between the at least one data line and the ground rail in response to determining the selected signal strength threshold.

13. The electronic device of claim 11, wherein the at least one selected device circuit is configured to assert a negative fractional voltage corresponding to the selected signal strength threshold between the at least one data line and the supply rail in response to determining the selected signal strength threshold.

14. The electronic device of claim 6, wherein the data bus comprises a bus selected from the group consisting of: a MIPI Alliance SoundWire bus; and a Mobile Industry Processor Interface (MIPI) Alliance Serial Low-power Interchip Media Bus (SLIMbus).

15. The electronic device of claim 6, wherein:
the plurality of device circuits comprises a plurality of microphones; and
at least one selected microphone among the plurality of microphones is configured to:
  determine a matching level of a hot word in an incoming audio signal;
  compare the determined matching level of the hot word against one or more predefined matching level thresholds to determine a selected matching level threshold among the one or more predefined matching level thresholds, wherein the selected matching level threshold is less than the determined matching level of the hot word; and
  assert the at least one fractional potential corresponding to the selected matching level threshold on the at least one data line in response to determining the selected matching level threshold among the one or more predefined matching level thresholds.

16. An electronic device, comprising:
a data bus comprising a clock line and at least one data line;
a host circuit coupled to the data bus and configured to:
  determine a cumulative potential representing a cumulative fractional bus activation vote on the at least one data line; and
  activate the clock line in response to determining the cumulative potential on the at least one data line being greater than a configurable bus activation threshold; and
a plurality of device circuits coupled to the data bus, wherein at least one selected device circuit among the plurality of device circuits is configured to:
  determine a signal strength of an incoming signal;
  compare the determined signal strength against one or more predefined signal strength thresholds to determine a selected signal strength threshold among the one or more predefined signal strength thresholds, wherein the selected signal strength threshold is less than the determined signal strength; and
  assert at least one fractional potential corresponding to the selected signal strength threshold on the at least one data line in response to determining the selected signal strength threshold, wherein the at least one fractional potential represents at least one fractional bus activation vote in the cumulative fractional bus activation vote.

17. The electronic device of claim 16, wherein the at least one selected device circuit is configured to determine the selected signal strength threshold by selecting a largest predefined signal strength threshold that is less than the determined signal strength.

18. The electronic device of claim 16, wherein the at least one selected device circuit is configured to determine the signal strength of the incoming signal based on determined potential of the incoming signal.

19. The electronic device of claim 16, wherein the at least one selected device circuit is configured to determine the signal strength of the incoming signal based on determined signal-to-noise ratio (SNR) of the incoming signal.

20. The electronic device of claim 16, wherein the at least one selected device circuit is configured to determine the signal strength of the incoming signal based on determined matching accuracy of the incoming signal.

21. The electronic device of claim 16, wherein the at least one data line is coupled to a supply rail and a ground rail in the electronic device.

22. The electronic device of claim 21, wherein the host circuit is configured to determine the cumulative potential based on a positive cumulative voltage asserted between the at least one data line and the ground rail.

23. The electronic device of claim 21, wherein the host circuit is configured to determine the cumulative potential based on a negative cumulative voltage asserted between the at least one data line and the supply rail.

24. The electronic device of claim 21, wherein the at least one selected device circuit is configured to assert a positive fractional voltage corresponding to the selected signal strength threshold between the at least one data line and the ground rail in response to determining the selected signal strength threshold.

25. The electronic device of claim 21, wherein the at least one selected device circuit is configured to assert a negative fractional voltage corresponding to the selected signal strength threshold between the at least one data line and the supply rail in response to determining the selected signal strength threshold.

26. The electronic device of claim 16, wherein the data bus comprises a bus selected from the group consisting of: a Mobile Industry Processor Interface (MIPI) Alliance SoundWire bus; and a MIPI Alliance Serial Low-power Inter-chip Media Bus (SLIMbus).

27. The electronic device of claim 16, wherein:
the plurality of device circuits comprises a plurality of microphones; and
at least one selected microphone among the plurality of microphones is configured to:
determine a matching level of a hot word in an incoming audio signal;
compare the determined matching level of the hot word against one or more predefined matching level thresholds to determine a selected matching level threshold among the one or more predefined matching level thresholds, wherein the selected matching level threshold is less than the determined matching level of the hot word; and
assert the at least one fractional potential corresponding to the selected matching level threshold on the at least one data line in response to determining the selected matching level threshold among the one or more predefined matching level thresholds.

28. An electronic device, comprising:
a data bus comprising a clock line and at least one data line;
a means for activating the data bus coupled to the data bus and configured to:
determine a cumulative potential representing a cumulative fractional bus activation vote on the at least one data line; and
activate the clock line in response to determining the cumulative potential on the at least one data line being greater than a configurable bus activation threshold; and
a plurality of means for voting coupled to the data bus, wherein at least one selected means for voting among the plurality of means for voting is configured to:
determine a signal strength of an incoming signal;
compare the determined signal strength against one or more predefined signal strength thresholds to determine a selected signal strength threshold among the one or more predefined signal strength thresholds, wherein the selected signal strength threshold is less than the determined signal strength; and
assert at least one fractional potential corresponding to the selected signal strength threshold on the at least one data line in response to determining the selected signal strength threshold, wherein the at least one fractional potential represents at least one fractional bus activation vote in the cumulative fractional bus activation vote.

* * * * *